(12) United States Patent
Fujiwara

(10) Patent No.: US 12,307,139 B2
(45) Date of Patent: *May 20, 2025

(54) IMAGE FORMING APPARATUS

(71) Applicant: CANON KABUSHIKI KAISHA, Tokyo (JP)

(72) Inventor: Izumi Fujiwara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,189

(22) Filed: Apr. 19, 2024

(65) Prior Publication Data

US 2024/0272846 A1 Aug. 15, 2024

Related U.S. Application Data

(63) Continuation of application No. 18/363,625, filed on Aug. 1, 2023, now Pat. No. 11,995,363.

(30) Foreign Application Priority Data

Aug. 5, 2022 (JP) ................................ 2022-125411

(51) Int. Cl.
*G06F 3/12* (2006.01)
(52) U.S. Cl.
CPC .......... *G06F 3/1236* (2013.01); *G06F 3/1204* (2013.01); *G06F 3/121* (2013.01); *G06F 3/1235* (2013.01); *G06F 3/1292* (2013.01)

(58) Field of Classification Search
CPC ...... G06F 3/1236; G06F 3/1204; G06F 3/121; G06F 3/1235; G06F 3/1292
USPC ....................................... 358/1.15
See application file for complete search history.

(56) References Cited

U.S. PATENT DOCUMENTS

| | | | |
|---|---|---|---|
| 10,230,522 B1* | 3/2019 | Roths | H04L 67/12 |
| 2015/0373006 A1* | 12/2015 | Lindteigen | H04L 63/083 |
| | | | 726/6 |
| 2020/0019352 A1 | 1/2020 | Agrawal | |
| 2020/0029350 A1* | 1/2020 | Asterjadhi | H04W 28/0268 |
| 2021/0045120 A1* | 2/2021 | Gidvani | H04W 72/535 |
| 2022/0210741 A1* | 6/2022 | Fujimori | H04W 52/0241 |

FOREIGN PATENT DOCUMENTS

TW 201610828 A 3/2016

* cited by examiner

*Primary Examiner* — Allen H Nguyen
(74) *Attorney, Agent, or Firm* — Canon U.S.A., Inc. IP Division

(57) ABSTRACT

An image forming apparatus includes a control unit configured to control the image forming apparatus not to execute orthogonal frequency division multiple access (OFDMA) complying with an Institute of Electrical and Electronics Engineers (IEEE) 802.11 standard, in wireless communication in a direct communication mode, based on a setting made on a setting screen, and a print processing unit configured to execute print processing onto a sheet based on a print job received via wireless communication in the direct communication mode.

13 Claims, 16 Drawing Sheets

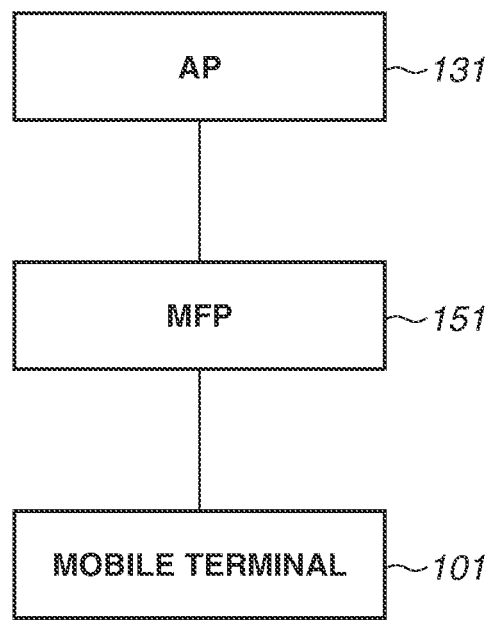

IMAGE FORMING APPARATUS

CROSS-REFERENCE TO RELATED APPLICATIONS

This application is a Continuation of co-pending U.S. patent application Ser. No. 18/363,625 filed Aug. 1, 2023, which claims priority benefit of Japanese Application No. 2022-125411 filed Aug. 5, 2022. The above-identified applications are hereby incorporated by reference herein in their entireties.

BACKGROUND

Field

The present disclosure relates to an image forming apparatus.

Description of the Related Art

Japanese Patent Application Laid-Open No. 2012-19487 discusses a technique that enables an image forming apparatus to concurrently execute wireless communication in an infrastructure mode via an access point and wireless communication in an ad hoc mode.

In recent years, wireless communication is used in a broad range of implementations, and highly-convenient wireless communication is desired to be provided.

SUMMARY

According to one embodiment of the present disclosure, an image forming apparatus includes a first setting unit configured to enable a first mode in which wireless communication is executed via an external access point existing on an outside of the image forming apparatus, a second setting unit configured to enable a second mode in which wireless communication is executed not via an external access point existing on an outside of the image forming apparatus, a providing unit configured to provide a setting screen regarding orthogonal frequency division multiple access (OFDMA) complying with an Institute of Electrical and Electronics Engineers (IEEE) 802.11 standard in wireless communication in the second mode, a receiving unit configured to receive a first Trigger frame including information regarding OFDMA complying with an IEEE 802.11 standard, from an external access point existing on an outside of the image forming apparatus, while the first mode is enabled, a communication unit configured to execute communication processing in the first mode by OFDMA complying with an IEEE 802.11 standard, based on information regarding the first Trigger frame, a control unit configured to control the image forming apparatus not to execute OFDMA complying with an IEEE 802.11 standard, in wireless communication in the second mode, based on a setting made on the setting screen, in a case where OFDMA complying with an IEEE 802.11 standard is enabled in the first mode, and a print processing unit configured to execute print processing onto a sheet based on a print job received via wireless communication in the first mode or wireless communication in the second mode.

Further features of the present disclosure will become apparent from the following description of exemplary embodiments with reference to the attached drawings.

BRIEF DESCRIPTION OF THE DRAWINGS

FIG. 1 is a diagram illustrating an example of a system configuration according to the present exemplary embodiment.

DESCRIPTION OF THE EMBODIMENTS

Figure 2A:
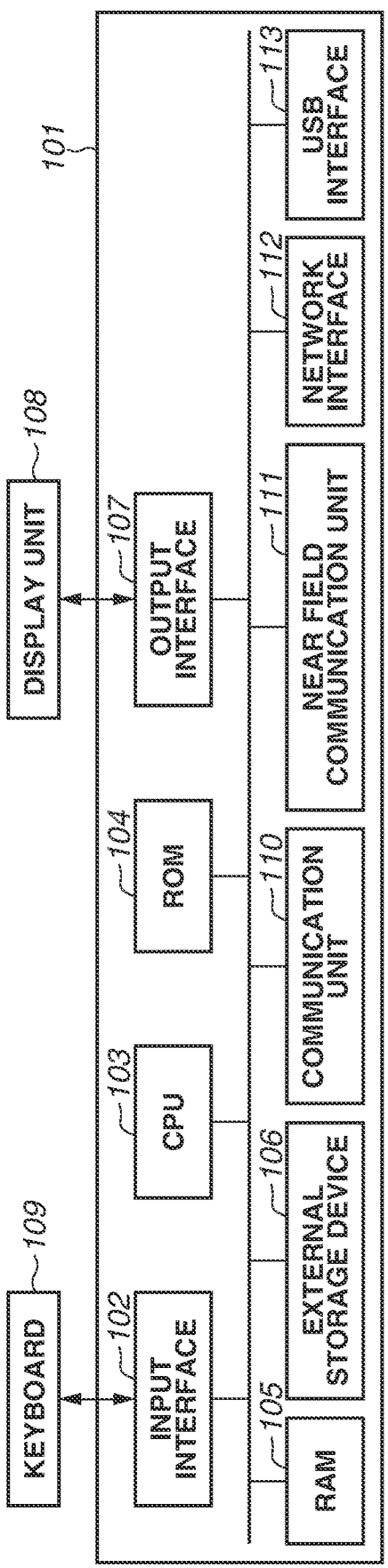
FIG. 2A is a diagram illustrating an example of a hardware configuration of a mobile terminal.

Hereinafter, exemplary embodiments of the present disclosure will be described in detail with reference to the drawings. The present exemplary embodiment merely serve as examples. It should be noted that, unless otherwise stated, specific examples of components, processing steps and display screens are not intended to limit the scope of the present invention to the described items.

(System Configuration)

FIG. 1 illustrates a configuration example of a system according to the present exemplary embodiment. In one example, this system is a wireless communication system in which a plurality of communication apparatuses can wirelessly communicate with each other. In the example illustrated in FIG. 1, this system includes an access point (AP) 131, a multifunction peripheral (MFP) 151, and a mobile terminal 101. An example of the mobile terminal 101 is a laptop personal computer or a smartphone.

The MFP 151 has a print function, a reading function (scanner), and a FAX function. The MFP 151 according to the present exemplary embodiment also has a communication function that enables wireless communication with the mobile terminal 101. In the present exemplary embodiment, the description will be given of a case where the MFP 151 is used as an example of a communication apparatus, but a communication apparatus is not limited to this. For example, a facsimile apparatus, a scanner apparatus, a projector, or a single-function printing apparatus may be used in place of the MFP 151. In the present exemplary embodiment, an apparatus having a print function will be sometimes referred to as an image forming apparatus.

The access point 131 is provided separately from (on the outside of) the mobile terminal 101 and the MFP 151, and operates as a base station apparatus of a wireless local area network (LAN) (WLAN). The access point 131 will be sometimes described as an external access point 131 or an external wireless base station (or an external master station) 131. The MFP 151 having a communication function of the WLAN can perform communication in an infrastructure mode of the WLAN via the access point 131. Hereinafter, an access point will be sometimes referred to as an "AP". The infrastructure mode will be sometimes referred to as a "wireless infrastructure mode".

The infrastructure mode is a mode in which the MFP 151 communicates with another apparatus via an external apparatus (for example, the AP 131) that forms a network. Connection with an external AP that is established by the MFP 151 operating in the infrastructure mode will be referred to as infrastructure connection. In the infrastructure connection in the present exemplary embodiment, the MFP 151 operates as a slave station and the external AP 131 operates as a master station. In the present exemplary embodiment, the master station refers to an apparatus that forms a network and determines a communication channel to be used in the network. The slave station refers to an apparatus that does not determine a communication channel to be used in a network to which the slave station belongs, and executes wireless communication in a communication channel determined by a master station.

The AP 131 performs wireless communication with a communication apparatus (authenticated) permitted to connect to the AP 131, and relays wireless communication between the communication apparatus and another communication apparatus. The AP 131 can be connected to a wired communication network, for example, and relay communication between a communication apparatus connected to the wired communication network, and another communication apparatus wirelessly connecting to the access point 131.

Using WLAN communication functions included in the mobile terminal 101 and the MFP 151, the mobile terminal 101 and the MFP 151 can perform wireless communication in the wireless infrastructure mode via the external AP 131 or in a peer-to-peer mode not involving the external AP 131. Hereinafter, peer to peer will be referred to as "P2P".

Alternatively, communication executed without involving the external AP 131 will be sometimes referred to as direct wireless communication. The P2P mode includes Wi-Fi Direct® and a software AP mode. Hereinafter, Wi-Fi Direct® will be sometimes referred to as WFD. The P2P mode can also be said to be communication complying with an Institute of Electrical and Electronics Engineers (IEEE) 802.11 series standard.

The P2P mode refers to a mode in which the MFP 151 directly communicates with another apparatus such as the mobile terminal 101 without involving an external apparatus that forms a network. In the present exemplary embodiment, the P2P mode includes an AP mode in which the MFP 151 operates as an AP. AP connection information (service set identifier (SSID) or password) to be enabled within the MFP 151 when the MFP 151 operates in the AP mode can be arbitrarily set by a user. The P2P mode may include a WFD mode for the MFP 151 performing communication by Wi-Fi Direct® (WFD), for example. A device that is to operate as a master station is determined from among a plurality of WFD supporting devices in accordance with a sequence called Group Owner Negotiation, for example. The master station may be determined without Group Owner Negotiation being executed. In particular, an apparatus that is a WFD supporting device and plays a role as a master station will be referred to as a Group Owner. Direct connection with another apparatus that is established by the MFP 151 operating in the P2P mode will be referred to as direct connection. In the direct connection in the present exemplary embodiment, the MFP 151 operates as a master station and another apparatus (mobile terminal 101, etc.) operates as a operates as a slave station.

Figure 2B:
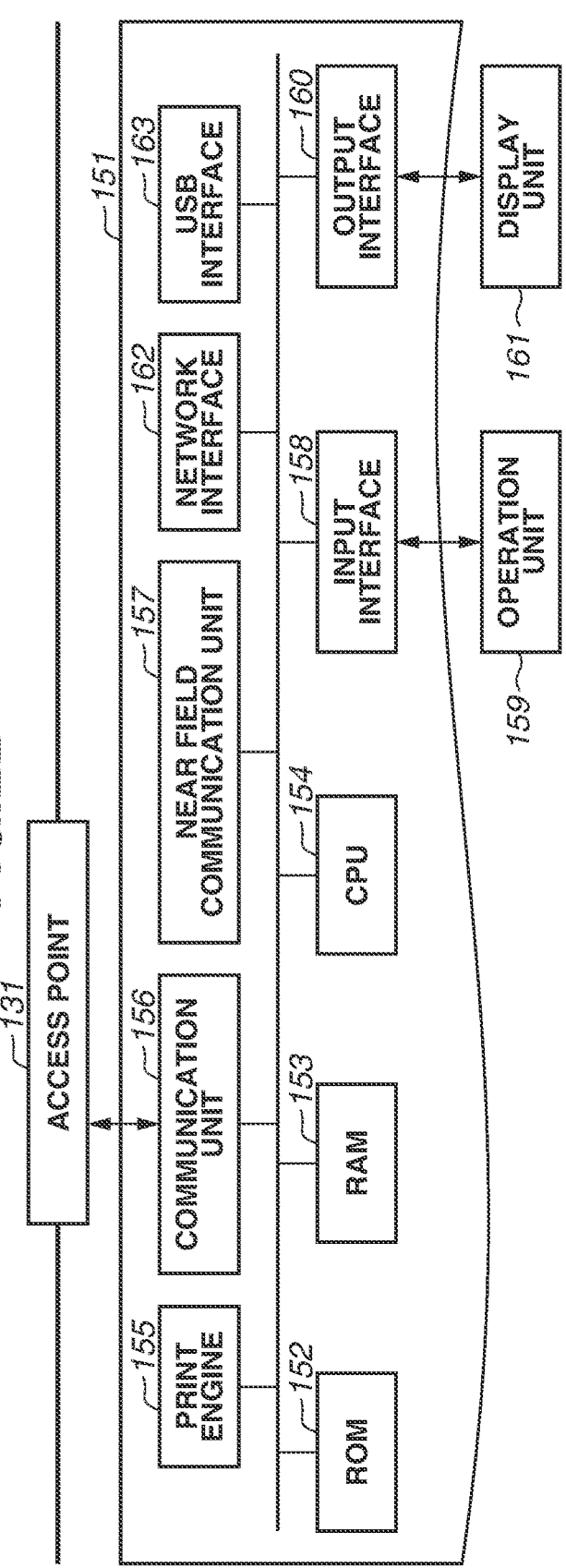
FIG. 2B is a diagram illustrating an example of a hardware configuration of an image forming apparatus.

Next, configurations of a mobile terminal according to the present exemplary embodiment, and a communication apparatus that can communicate with the mobile terminal according to the present exemplary embodiment will be described with reference to FIGS. 2A and 2B. In the present exemplary embodiment, the description will be given using the following configuration as an example, but functions are not specifically limited to the functions illustrated in FIGS. 2A and 2B because the present exemplary embodiment can be applied to an apparatus that can perform communication with a communication apparatus.

The mobile terminal 101 includes an input interface 102, a central processing unit (CPU) 103, a read-only memory (ROM) 104, a random access memory (RAM) 105, an external storage device 106, an output interface 107, a display unit 108, a keyboard 109, a communication unit 110, a near field communication unit 111, a network interface 112, and a universal serial bus (USB) interface 113. A computer of the mobile terminal 101 is formed by the CPU 103, the ROM 104, and the RAM 105.

The input interface 102 is an interface for receiving data input and operation instructions from the user by an operation unit such as the keyboard 109 being operated. The operation unit may be a physical keyboard or a physical button, or may be a software keyboard or a software button that is displayed on the display unit 108. In other words, the input interface 102 may receive input (operation) from the user via the display unit 108.

The CPU 103 is a system control unit and controls the entire mobile terminal 101. The ROM 104 stores fixed data such as control programs to be executed by the CPU 103, data tables, and an embedded operating system (hereinafter, will be referred to as "OS") program. In the present exemplary embodiment, each control program stored in the ROM 104 performs software execution control such as scheduling, task switch, or interrupt processing under the control of an embedded OS stored in the ROM 104.

The RAM 105 includes a static random access memory (SRAM) requiring a backup power source. Because data is held in the RAM 105 by a primary battery for data backup (not illustrated), the RAM 105 can store important data such as program control variables without volatilizing the data. The RAM 105 is also provided with a memory area for storing setting information of the mobile terminal 101 and management data of the mobile terminal 101. The RAM 105 is also used as a main memory and a work memory of the CPU 103.

The external storage device 106 stores a print information generation program for generating print information interpretable by a printing apparatus 151, for example. The output interface 107 is an interface that performs control for the display unit 108 performing data display and notification of a state of the mobile terminal 101.

The display unit 108 includes a light emitting diode (LED) and a liquid crystal display (LCD), and performs data display and notification of a state of the mobile terminal 101. The communication unit 110 is a component for connecting with apparatuses such as the MFP 151 and the access point (AP) 131, and executing data communication. For example, the communication unit 110 can connect to an internal AP (not illustrated) in the MFP 151. By the communication unit 110 and the internal AP in the MFP 151 connecting with each other, the mobile terminal 101 and the MFP 151 become able to perform P2P communication. The communication unit 110 may directly communicate with the MFP 151 via wireless communication, or may communicate with the MFP 151 via an external apparatus such as the AP 131 that exists on the outside of the mobile terminal 101 and the MFP 151. The external apparatus includes an external AP (AP 131, etc.) existing on the outside of the mobile terminal 101 and on the outside of the MFP 151, and an apparatus other than an AP that can relay communication. In the present exemplary embodiment, a wireless communication method to be used by the communication unit 110 is assumed to be Wireless Fidelity (Wi-Fi)®, which is a communication standard complying with an IEEE 802.11 series standard. Examples of the AP 131 include devices such as a wireless LAN router.

The near field communication unit 111 is a component for performing near field wireless connection with an apparatus such as the MFP 151 and executing data communication, and performs communication using a communication method different from that of the communication unit 110.

The near field communication unit 111 can connect with a near field communication unit 157 in the MFP 151, for example. Examples of communication methods include Near Field Communication (NFC), Bluetooth® Classic, Bluetooth® Low Energy, and Wi-Fi Aware.

The network interface 112 is a connection interface (I/F) that controls wireless communication and communication processing executed via a wired LAN cable.

The USB interface 113 is a connection I/F that controls USB connection established via a USB cable. Specifically, the USB interface 113 is an interface for connecting with apparatuses such as the MFP 151 and the external AP 131 via a USB, and executing data communication.

Subsequently, the MFP 151 will be described. The MFP 151 includes a ROM 152, a RAM 153, a CPU 154, a print engine 155, a communication unit 156, the near field communication unit 157, an input interface 158, an operation unit 159, an output interface 160, a display unit 161, a network interface 162, and a USB interface 163. A computer of the MFP 151 is formed by the ROM 152, the RAM 153, and the CPU 154.

The communication unit 156 controls communication processing executed via each interface. For example, the MFP 151 can operate in an infrastructure mode and a peer to peer (P2P) mode as modes for performing communication using the communication unit 156.

Specifically, the communication unit 156 can operate as an internal AP in the MFP 151. For example, by the user issuing an instruction to activate the internal AP, the MFP 151 operates as an AP. In the present exemplary embodiment, a wireless communication method to be used by the communication unit 156 is assumed to be a communication standard complying with an IEEE 802.11 series standard. In the following description, Wi-Fi® (Wi-Fi communication) is a communication standard complying with an IEEE 802.11 series standard. The communication unit 156 may include hardware functioning as an AP, or may operate as an AP (operate in the software AP mode) by software for causing the communication unit 156 to function as an AP. In a case where the communication unit 156 operates as a master station, the communication unit 156 can concurrently maintain P2P wireless connection with a predetermined number of slave station apparatuses or less (for example, three apparatuses or less). The communication unit 156 can execute wireless communication using a frequency band selected from among 2.4 gigahertz (GHz), 5 GHz, and 6 GHz.

The near field communication unit 157 is a component for performing near field wireless connection with an apparatus such as the mobile terminal 101, and can connect with the near field communication unit 111 in the mobile terminal 101, for example. Examples of communication methods include NFC, Bluetooth® Classic, Bluetooth® Low Energy, and Wi-Fi Aware.

The RAM 153 includes an SRAM requiring a backup power source. Because data is held in the RAM 153 by a primary battery for data backup (not illustrated), the RAM 153 can store important data such as program control variables without volatilizing the data. The RAM 153 is also provided with a memory area for storing setting information of the MFP 151 and management data of the MFP 151. The RAM 153 is also used as a main memory and a work memory of the CPU 154, and stores a receive buffer for temporarily storing print information received from the mobile terminal 101, and various types of information.

The ROM 152 stores fixed data such as control programs to be executed by the CPU 154, data tables, and an OS program. In the present exemplary embodiment, each control program stored in the ROM 152 performs software execution control such as scheduling, task switch, or interrupt processing under the control of an embedded OS stored in the ROM 152.

The CPU 154 is a system control unit and controls the entire MFP 151.

Based on information stored in the RAM 153 or a print job received from the mobile terminal 101, the print engine 155 executes print processing of forming an image onto a recording medium such as a sheet by adding recording material such as ink to the recording medium, and outputs a printed result. Because a print job to be transmitted from the mobile terminal 101 generally has a large data amount, a communication method that enables high-speed communication is desired to be used in the communication of the print job. The MFP 151 therefore receives the print job via the communication unit 156 that can perform communication at higher speed than the near field communication unit 157. The printing executed using ink is an example, and printing may be executed using an electrophotographic method that uses toner. In addition, a cartridge type MFP to which an ink cartridge is attached, or an MFP including an ink tank to be supplied with ink from an ink bottle may be used.

A memory such as an external hard disk drive (HDD) or a secure digital (SD) card may be attached to the MFP 151 as an optional device, and information stored in the MFP 151 may be stored in the memory.

The input interface 158 is an interface for receiving data input and operation instructions from the user by the operation unit 159 such as a physical button being operated. The operation unit 159 may be a software keyboard or a software button that is displayed on the display unit 161.

In other words, the input interface 158 may receive input from the user via the display unit 161.

The output interface 160 is an interface that performs control for the display unit 161 performing data display and notification of a state of the MFP 151.

The display unit 161 includes an LED and an LCD, and performs data display and notification of a state of the MFP 151.

The USB interface 163 is an interface that controls USB connection established via a USB cable. Specifically, the USB interface 163 is an interface for connecting with apparatuses such as the mobile terminal 101 and an external AP via a USB, and executing data communication.

Figure 3:
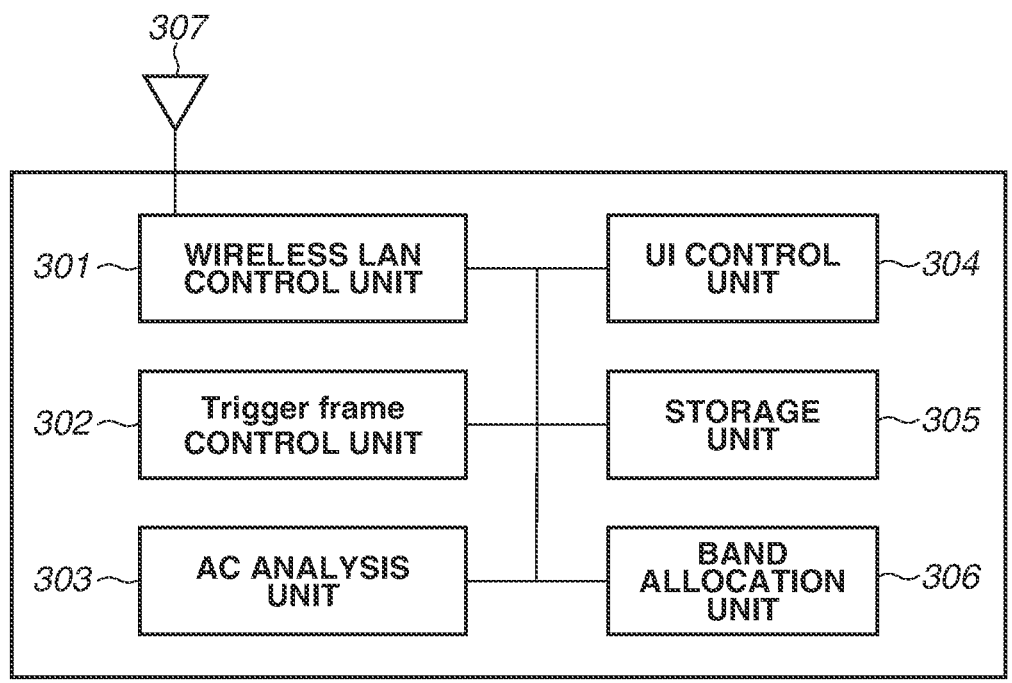
FIG. 3 is a diagram illustrating an example of a functional configuration of an access point.

FIG. 3 is a block diagram illustrating a functional configuration example of the AP 131. The AP 131 includes, as its functional configurations, for example, a wireless LAN control unit 301, a Trigger frame control unit 302, a received frame analysis unit 303, a user interface (UI) control unit 304, a storage unit 305, and a band allocation unit 306.

The wireless LAN control unit 301 executes control for performing transmission and reception of radio signals with another wireless LAN communication apparatus. The wireless LAN control unit 301 can be implemented by a program for controlling a baseband circuit for a wireless LAN, a radio frequency (RF) circuit, and an antenna 307, for example. The wireless LAN control unit 301 executes communication control of the wireless LAN in accordance with an IEEE 802.11 series standard, and executes wireless communication with a station (STA) (equivalent to a slave station) complying with the IEEE 802.11 series standard.

The Trigger frame control unit 302 performs control for transmitting a Trigger frame to an authenticated STA via the wireless LAN control unit 301. If the STA receives the Trigger frame, the STA transmits an uplink (UL) frame as a response to the Trigger frame. If the AP 131 receives the UL frame via the wireless LAN control unit 301, the AP 131 interprets the received UL frame in the received frame analysis unit 303. For example, in a case where the received UL frame includes information regarding an access category (AC), the received frame analysis unit 303 acquires the information regarding the AC by analysis, and identifies an AC of data to be transmitted by a transmission source STA of the UL frame.

Based on information acquired by the received frame analysis unit 303, the band allocation unit 306 determines the width of a frequency band to be allocated for data transmission from each STA, a central frequency of the frequency band, and a time at which the frequency band is allocated. In other words, the band allocation unit 306 determines a frequency range of a radio resource to be allocated to each STA, and a timing at which a radio resource is allocated to each STA. The Trigger frame control unit 302 notifies each STA of information indicating the allocation determined by the band allocation unit 306, via a Trigger frame, and causes an UL frame to be transmitted in accordance with the allocation.

The UI control unit 304 is implemented by a program for controlling user-interface-related hardware (not illustrated) of the AP 131 such as a touch panel or a button for receiving a user operation on the AP 131. The UI control unit 304 can also have a function for presenting information to the user, such as image display or voice output, for example. The storage unit 305 has a storage function that can be implemented by a ROM and a RAM storing programs and data for operating the AP 131.

Figure 7:
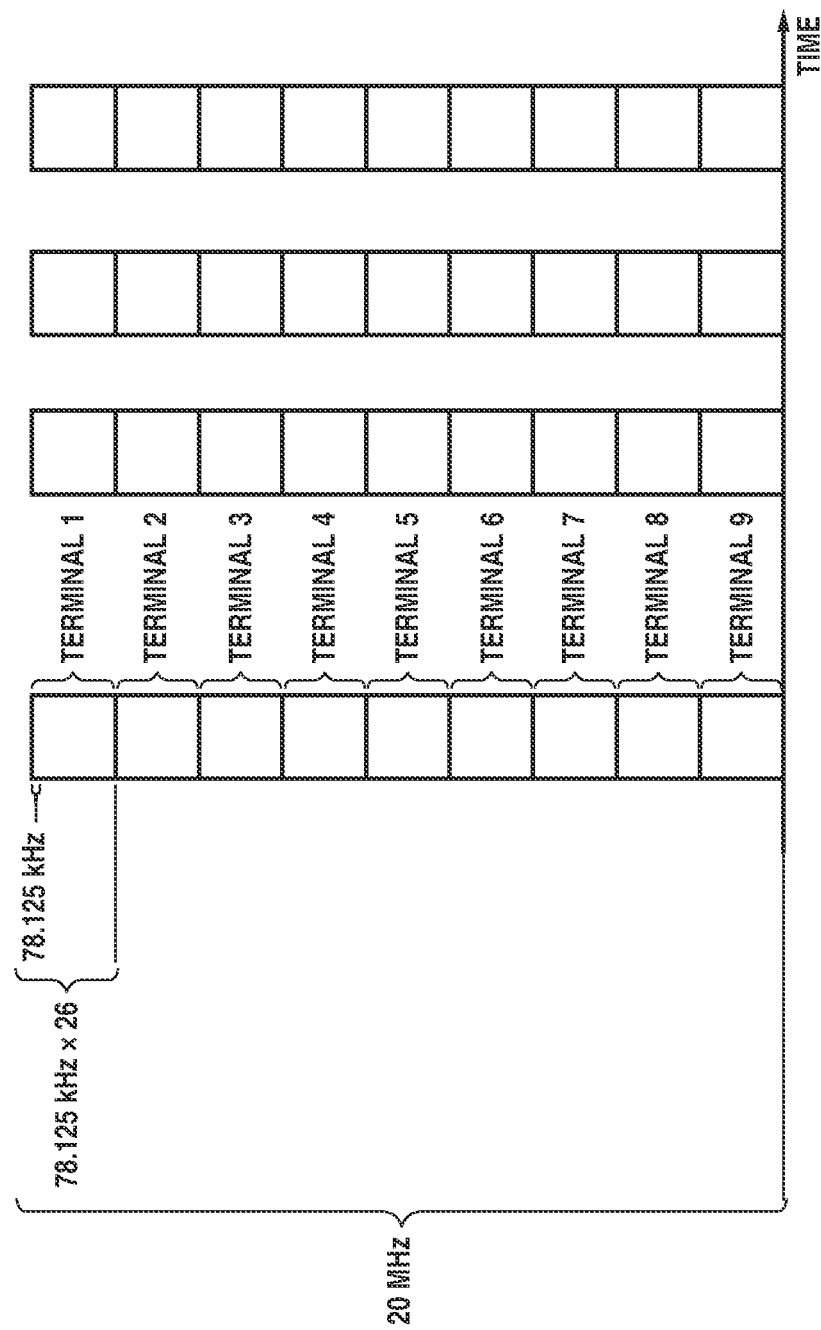
FIG. 7 is a diagram illustrating an example of a configuration of a sub channel.

FIG. 7 is a diagram illustrating a configuration of a subcarrier. In the IEEE 801.11ax, by making a frequency band smaller than 20 megahertz (MHz) allocatable to a STA, a number of STAs become able to concurrently use radio resources. Such radio resource allocation is performed using orthogonal frequency division multiple access (OFDMA). In the IEEE802.11ax, for example, a 20-MHz bandwidth is divided into nine blocks including 26 subcarriers (tones) not overlapping each other on a frequency axis, and a radio resource is allocated to a terminal on a block basis. The allocation unit block is called a resource unit (RU), and the size of the RU is defined in accordance with a frequency bandwidth and the number of terminals to which radio resources are allocated. The size of the RU is represented by the number of tones. For example, 26, 52, 106, 242, 484, 996, and 2×996 can be used. In the 20-MHz bandwidth, values equal to or smaller than 242 can be used from among these values. In a case where the entire 20-MHz bandwidth is allocated to one terminal, up to 242 tones can be allocated.

On the other hand, for example, in a case where nine terminals concurrently use the 20-MHz bandwidth, 26 tones are allocated to each terminal. In this manner, by dividing a frequency band into blocks each including 26 tones, which is the minimum allocation unit, nine terminals can concurrently perform communication using the 20-MHz bandwidth. Similarly, in a case where 40-MHz, 80-MHz, and 160-MHz frequency bandwidths are used, up to 18, 37, and 74 terminals can concurrently perform communication, respectively.

Figure 4:
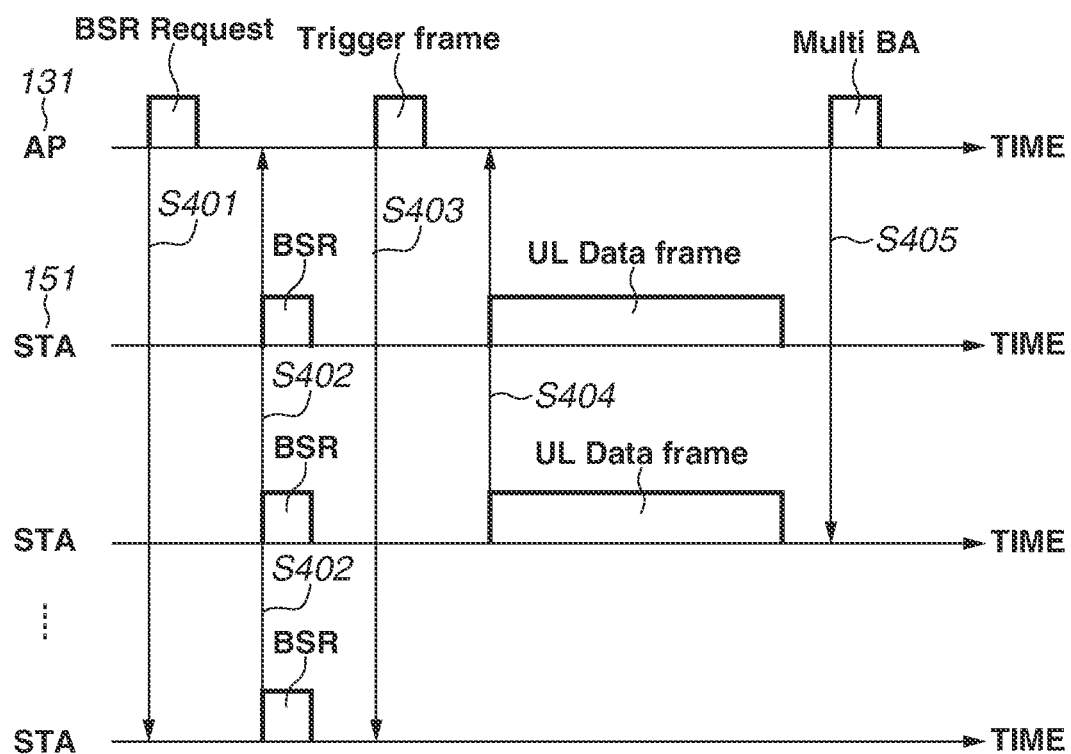
FIG. 4 is a diagram illustrating an example of communication processing according to the present exemplary embodiment.

Subsequently, a basic flow of UL multiuser (MU) communication will be initially described with reference to FIG. 4. First of all, in S401, the AP 131 transmits a Buffer Status Report Request (BSR Request) using the Trigger frame control unit 302. In the present exemplary embodiment, the AP 131, the MFP 151, and the mobile terminal 101 can execute communication that is based on the IEEE 801.11ax. In the present exemplary embodiment, the mobile terminal 101 does not belong to a network formed by the AP 131.

Figure 5:
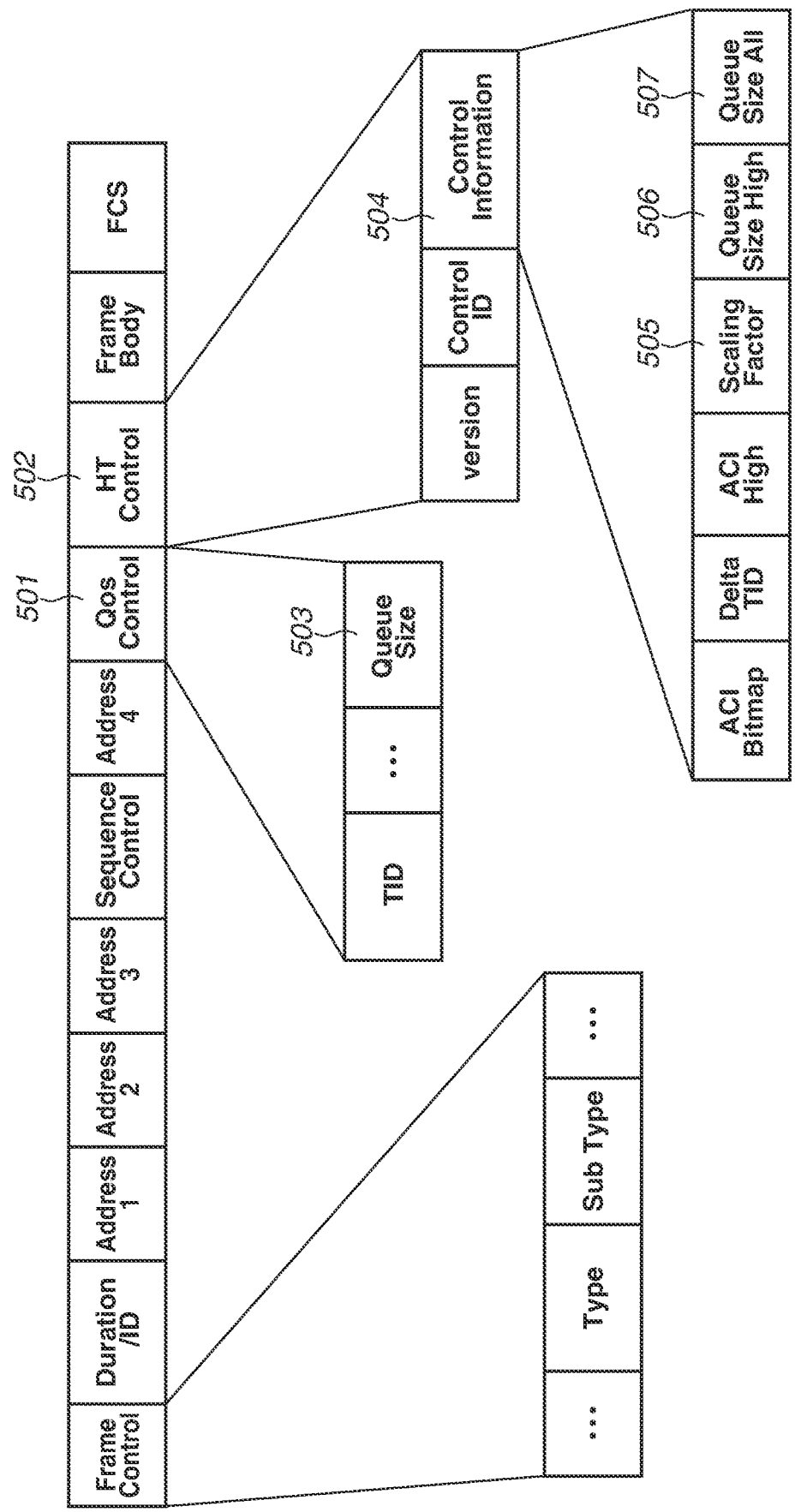
FIG. 5 is a diagram illustrating an example of a frame configuration.

Referring back to FIG. 4, in S402, each STA transmits a Buffer status report (BSR). The BSR is used when each STA notifies an AP of a transmission buffer amount of itself. FIG. 5 illustrates a configuration example of a BSR frame. A transmission buffer amount of each STA is indicated by a Queue size subfield 503 included in a QoS Control field 501. Alternatively, a transmission buffer amount of each STA can be indicated by a Scaling Factor subfield 505, a Queue Size High subfield 506, and a Queue Size All subfield 507 in a Control Information subfield 504 of an HT Control field 502.

Figure 6:
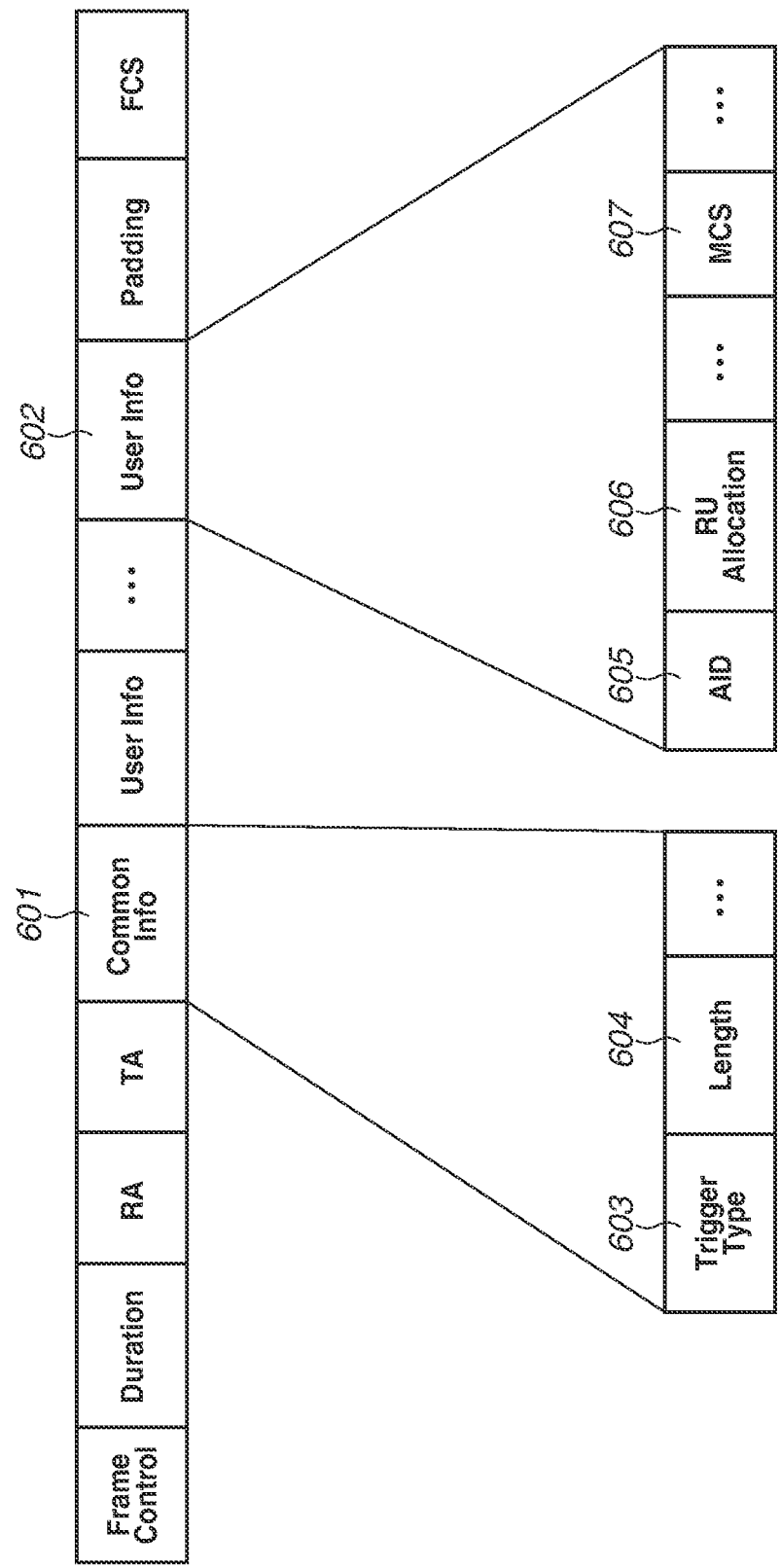
FIG. 6 is a diagram illustrating an example of a frame configuration.

If the AP 131 receives a BSR from each STA, in S403, the AP 131 transmits a Trigger frame for promoting each STA to transmit UL data, based on the received information. At this time, based on information regarding a transmission buffer amount that is included in the BSR frame, the AP 131 determines RU allocation in UL-OFDMA and a communication time common to all STAs. After that, the AP 131 transmits a Trigger frame including information (hereinafter, RU/communication time information) regarding a RU and a data communication time common to all STAs. That is, the AP 131 transmits a Trigger frame including information regarding OFDMA. FIG. 6 illustrates a configuration of a Trigger frame.

A Common Info field 601 includes information common to all STAs. A data communication time common to all STAs is set in a Length subfield 604 in the Common Info field 601. In a case where a Trigger Type subfield 603 indicates 0, a User Info field 602 is added. The Common Info field 601 includes another type of information. For example, carrier sense (CS) Required is included in the Common Info field 601, and information indicating whether to execute carrier sense is stored. In a case where information indicating that carrier sense is required to be executed is included, a STA that has received a Trigger frame executes carrier sense. On the other hand, in a case where information indicating that carrier sense is not required to be executed is included, a STA that has received a Trigger frame does not execute carrier sense. A STA is identified based on an AID subfield 605 of the User Info field 602. A RU (unit for combining a plurality of subcarriers) to be allocated to a corresponding STA, and a tone size are identified by an index value indicated by a RU Allocation subfield 606. The tone size is a value indicating the width of a frequency band allocatable to each STA. A modulation and coding scheme (MCS) is designated in an MCS subfield 607.

An AP reserves a communication channel for transmitting a Trigger frame. Then, the AP divides the reserved communication channel into a plurality of resource units, and allocates each resource unit to a terminal.

If each STA receives a Trigger frame including information regarding OFDMA, in S404, the STA transmits an UL Data frame within the range of a data amount defined by the Length subfield 604 of the Trigger frame. At this time, in a case where information indicating that carrier sense is required to be executed is included, the STA executes the transmission in S404 after executing carrier sense. For example, the MFP 151 may transmit scan data in S404. Aside from this, information regarding consumables (for example, at least one of an ink remaining amount, a toner remaining amount, and a sheet remaining amount) may be transmitted in S404. Alternatively, information indicating the state of the MFP 151 (paper jam error occurred, cover opened, etc.) may be transmitted.

If the AP 131 receives a physical layer protocol data unit (PPDU) from each STA, in S405, the AP 131 transmits Multi Block Ack (Multi BA) as receipt acknowledgement.

Subsequently, an operation of the MFP 151 will be described with reference to FIG. 8. In the MFP 151, both of the infrastructure mode and the P2P mode are enabled in accordance with an instruction from the user.

For example, the both modes are enabled by the user enabling the infrastructure mode using an operation panel of the MFP 151, and enabling the WFD mode. In P2P communication, the MFP 151 operates as a master station (for example, a group owner of WFD). In the P2P communication, P2P communication other than communication in the WFD mode may be executed. For example, communication in the software AP mode may be executed.

Here, the MFP 151 is assumed to have received a Trigger frame from the AP 131 in S403. In a case where both of infrastructure communication and P2P communication are enabled, the MFP 151 refers to a communication channel to be used in the infrastructure communication. Then, the MFP 151 may construct a network as a master station in such a manner as to execute P2P communication in the same communication channel. Alternatively, in a case where both of infrastructure communication and P2P communication are enabled, the MFP 151 refers to a communication channel to be used in the infrastructure communication. Then, the MFP 151 may construct a network as a master station in such a manner as to execute P2P communication in a communication channel different from the communication channel to be used in the infrastructure communication. That is, in FIG. 8, the MFP 151 receives a Trigger frame from the external AP 131 in S403 while both of the infrastructure mode and the P2P mode are enabled.

Because the MFP 151 operates as a master station, in S801, the MFP 151 transmits a Trigger frame. Here, the MFP 151 divides one communication channel (for example, 20 MHz) into a plurality of resource units using a Trigger frame as described above with reference to FIG. 6, and allocates each resource unit to a STA including the mobile terminal 101. That is, the RU Allocation subfield 606 of the Trigger frame transmitted by the MFP 151 includes information regarding allocation of resource units. Here, the number of slave station apparatuses to which resource units are allocated by the MFP 151 becomes the maximum number of slave station apparatuses with which direct connection can be concurrently maintained. For example, in a case where the communication unit 156 can concurrently maintain P2P wireless connection with up to three slave station apparatuses, the maximum number of slave station apparatuses to which resource units are allocated becomes three. That is, the maximum number of apparatuses to which resource units are allocated that is designated in the Trigger frame transmitted in S801 is the same as the maximum number of slave stations that can be concurrently maintained in direct connection. In S802, the mobile terminal 101 transmits data to the MFP 151 (S802). Here, the mobile terminal 101 transmits data using a resource unit allocated in the Trigger frame. For example, the mobile terminal 101 transmits a print job in S802. Alternatively, the mobile terminal 101 may transmit a status acquisition request of the MFP 151, or a remaining amount acquisition request of consumables (ink, toner, or sheet) in S802. In S803, the MFP 151 transmits Multi BA.

FIGS. 9A to 9I are diagrams each illustrating an example of a screen 900 to be displayed on the display unit 161 included in the MFP 151. A LAN setting screen (FIG. 9B) is displayed by the user selecting a LAN setting item 901 on the screen 900 in FIG. 9A.

Figure 9A:
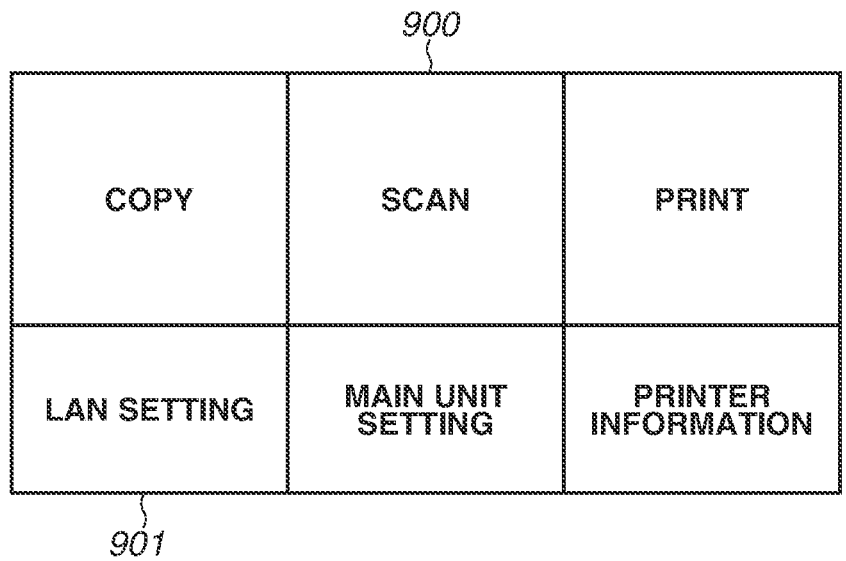
FIGS. 9A to 9I are diagrams each illustrating an example of an operation screen.
Figure 9B:
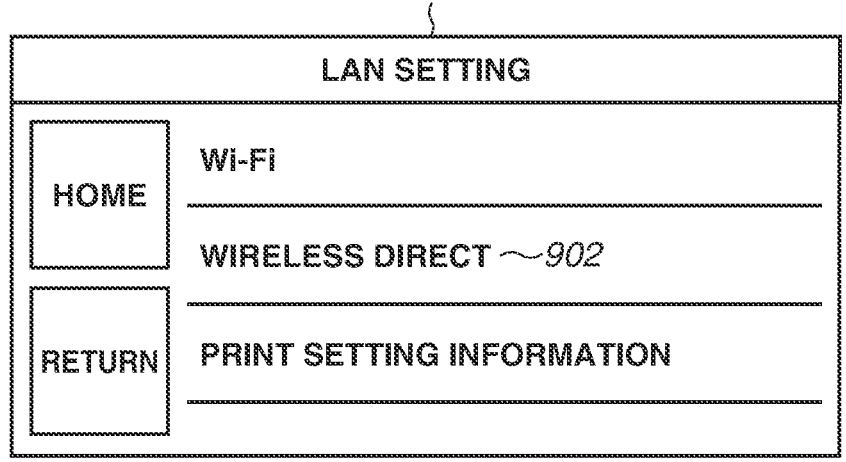

FIG. 9B is a diagram illustrating an example of a screen for making various network communication settings. In a case where "Wi-Fi" illustrated in FIG. 9B is selected, the setting of the infrastructure mode is made. In a case where "wireless direct 902" illustrated in FIG. 9B is selected, a screen illustrated in FIG. 9C is displayed.

Figure 9C:
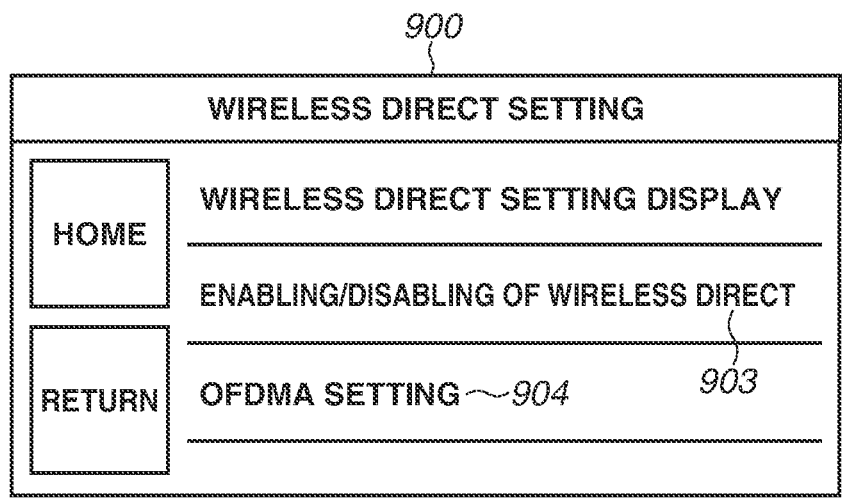

FIG. 9C is a diagram illustrating an example of a screen for making a wireless direct setting. By the user selecting a wireless direct communication enabling/disabling item 903, enabling or disabling of wireless communication in a wireless direct communication mode is set in the MFP 151. For example, in a case where enabling of the wireless direct mode is selected by the user, the CPU 154 operates the MFP 151 as a master station in the wireless direct mode. In a case where the user selects an OFDMA setting item 904, a screen illustrated in FIG. 9D is displayed.

Figure 9D:
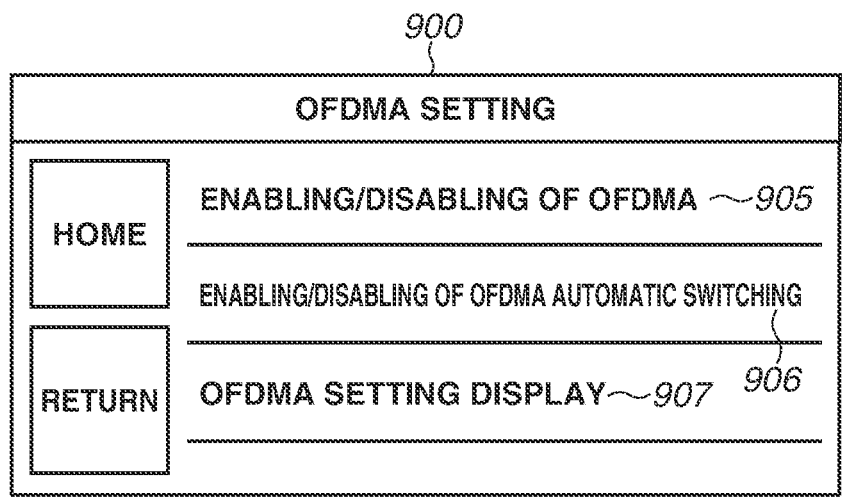

FIG. 9D is a diagram illustrating an example of a screen for making the setting of an OFDMA mode related to wireless direct. The screen illustrated in FIG. 9D includes a setting item 905, an automatic switching setting item 906, and a setting display item 907.

Figure 9E:
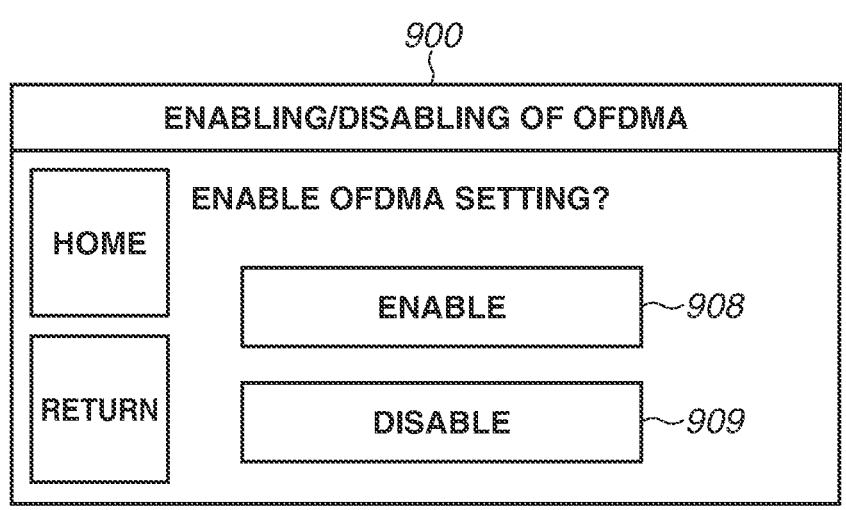

A screen illustrated in FIG. 9E is displayed in a case where the setting item 905 is selected. The screen illustrated in FIG. 9E includes an OFDMA enabling item 908 and an OFDMA disabling item 909. In a case where the OFDMA enabling item 908 is selected, an OFDMA setting is enabled in accordance with a flowchart in FIG. 10, which will be described below, and a mobile terminal directly connecting with the MFP 151 executes wireless communication with the MFP 151 using OFDMA.

Figure 8:
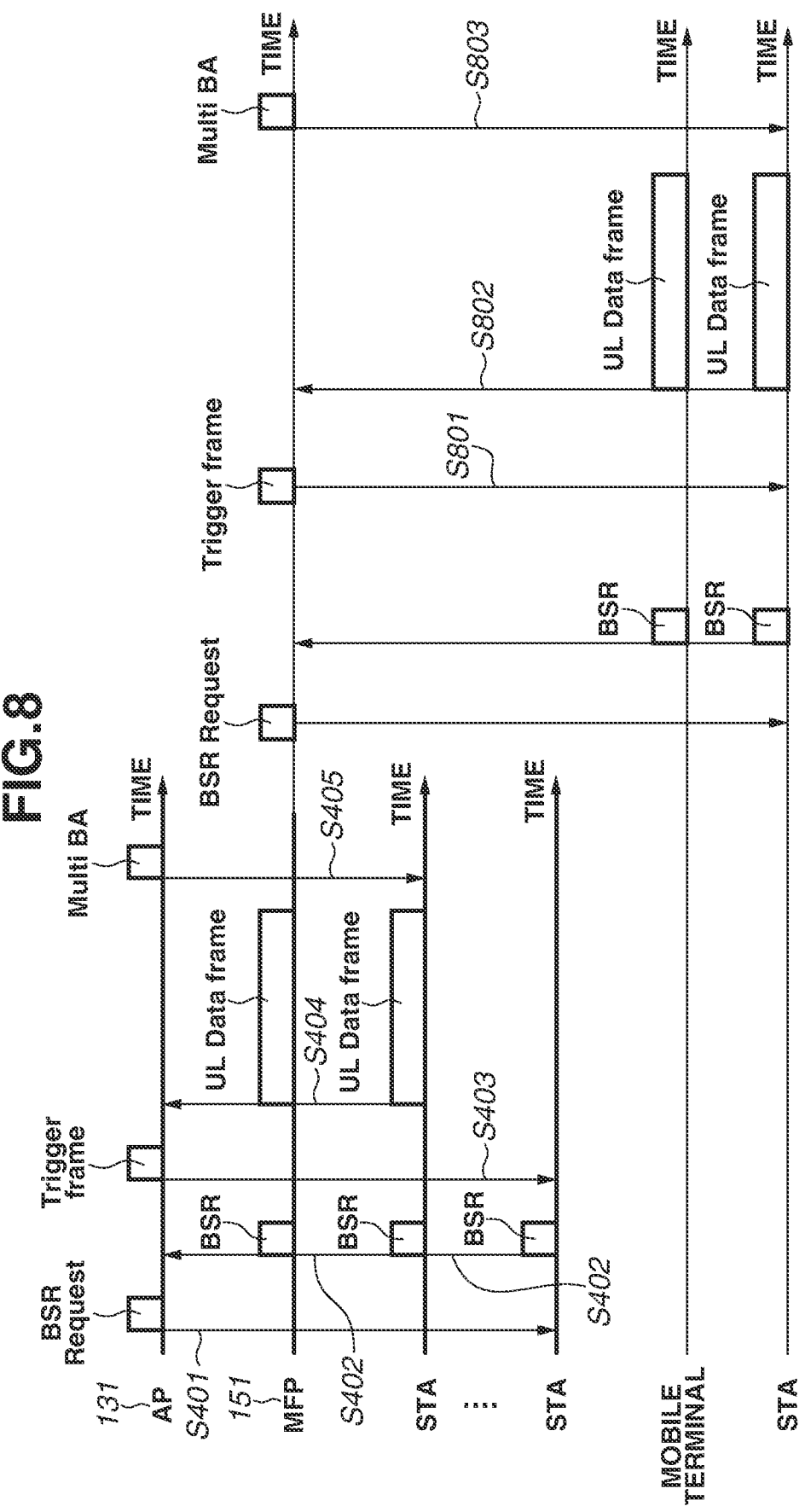
FIG. 8 is a diagram illustrating an example of communication processing executed between an access point, a mobile terminal, and an image forming apparatus.

In a case where the use of OFDMA is determined, in S801, the MFP 151 transmits the Trigger frame illustrated in FIG. 8, to the mobile terminal 101. The Trigger frame transmitted in S801 includes RU information, and the RU information includes information regarding OFDMA. The mobile terminal 101 that has received the Trigger frame in S801 enables an OFDMA function based on information included in the RU information, and executes communication.

On the other hand, in a case where the OFDMA disabling item 909 is selected, the MFP 151 disables the OFDMA setting in accordance with the flowchart in FIG. 10, which will be described below. Because the OFDMA setting is disabled, a mobile terminal directly connecting with the MFP 151 executes wireless communication with the MFP 151 using orthogonal frequency division multiplexing (OFDM).

In a case where it is determined to perform communication in an OFDM mode, in S801, the MFP 151 transmits the Trigger frame illustrated in FIG. 8, to the mobile terminal 101. The mobile terminal 101 that has received the Trigger frame transmitted in S801 disables the OFDMA function based on information included in the RU information, and executes communication in the OFDM mode.

Figure 9F:
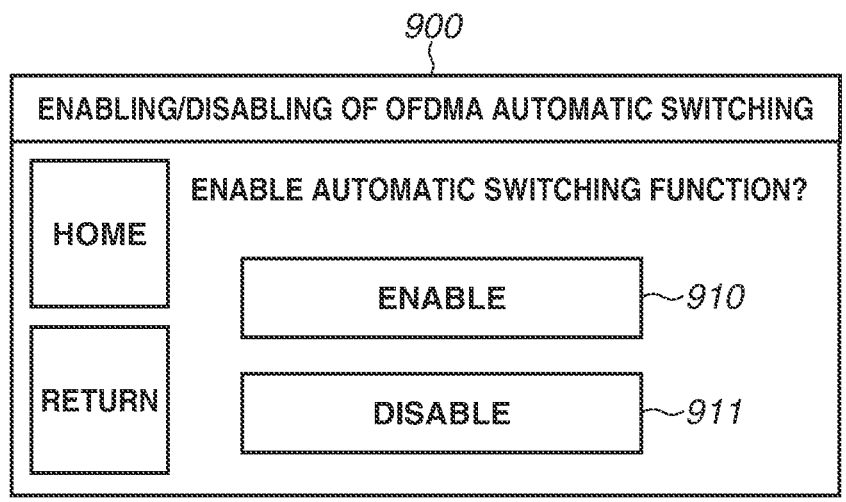

A screen illustrated in FIG. 9F is displayed in a case where the automatic switching setting item 906 is selected on the screen illustrated in FIG. 9D. The screen illustrated in FIG. 9F includes an automatic switching enabling item 910 and an automatic switching disabling item 911. In a case where the automatic switching enabling item 910 is selected, an automatic switching function of the OFDMA mode is enabled in accordance with a flowchart in FIG. 11. Then, the CPU 154 determines whether to perform direct wireless communication using OFDMA, or perform direct wireless communication using OFDM. In a case where the automatic switching enabling item 910 is selected, a screen illustrated in FIG. 9G is displayed.

Figure 9G:
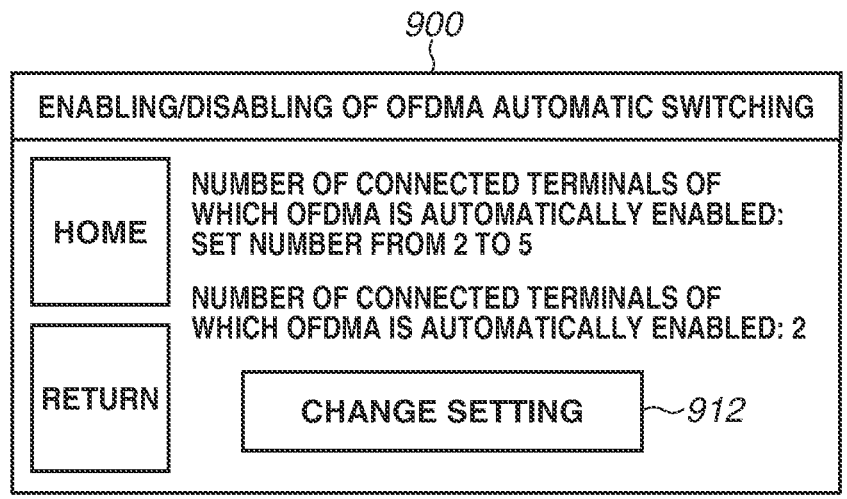
Figure 9H:
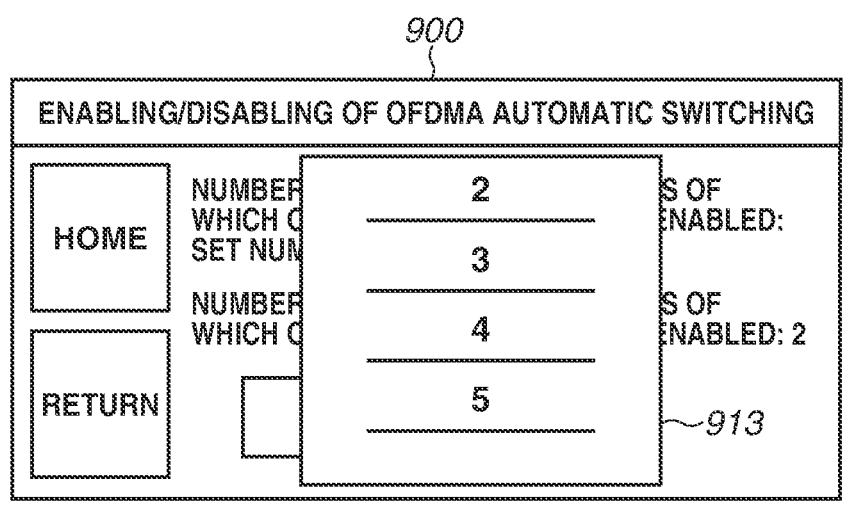

FIG. 9G illustrates an example of a screen for setting information necessary for automatic switching. In the present exemplary embodiment, as a condition for automatically switching the OFDMA mode to an enabled state, the user sets a threshold value (hereinafter, will be described as a switching condition) of the number of connected mobile terminals connected to the MFP 151 operating as a master station in direct communication. In a case where the setting of the switching condition is to be changed, the user selects a setting change item 912. If the user selects the setting change item 912, a screen 913 illustrated in FIG. 9H is displayed. Subsequently, by the user selecting a numerical value displayed on the screen 913, the switching condition can be changed. In a case where the switching condition is changed, an OFDMA mode automatic switching function is executed in accordance with a flowchart in FIG. 12, which will be described below. In a case where the setting of the OFDMA mode is changed, the mobile terminal 101 connecting to the MFP 151 is notified of the change in the OFDMA mode. In the present exemplary embodiment, the number of connected mobile terminals in direct connection has been described as a condition for automatically switching the OFDMA mode to the enabled state, but another type of information may be used. For example, a day of the week or a time slot may be set, and OFDMA may be automatically enabled only on a specific day of the week or during a specific time slot. For example, the state of the MFP 151 such as a printing state or a power saving state may be set, and OFDMA may be automatically enabled when the MFP 151 is in a specific state.

Alternatively, in a case where OFDMA is enabled in infrastructure communication, the CPU 154 may automatically disable OFDMA in direct communication. In contrast, in a case where OFDMA is disabled in infrastructure communication, the CPU 154 may automatically enable OFDMA in direct communication. Such processing is executed to prevent power consumption in an environment in which both the AP 131 and the MFP 151 exist, from increasing due to the execution of OFDMA in both of infrastructure communication and direct communication.

Figure 11:
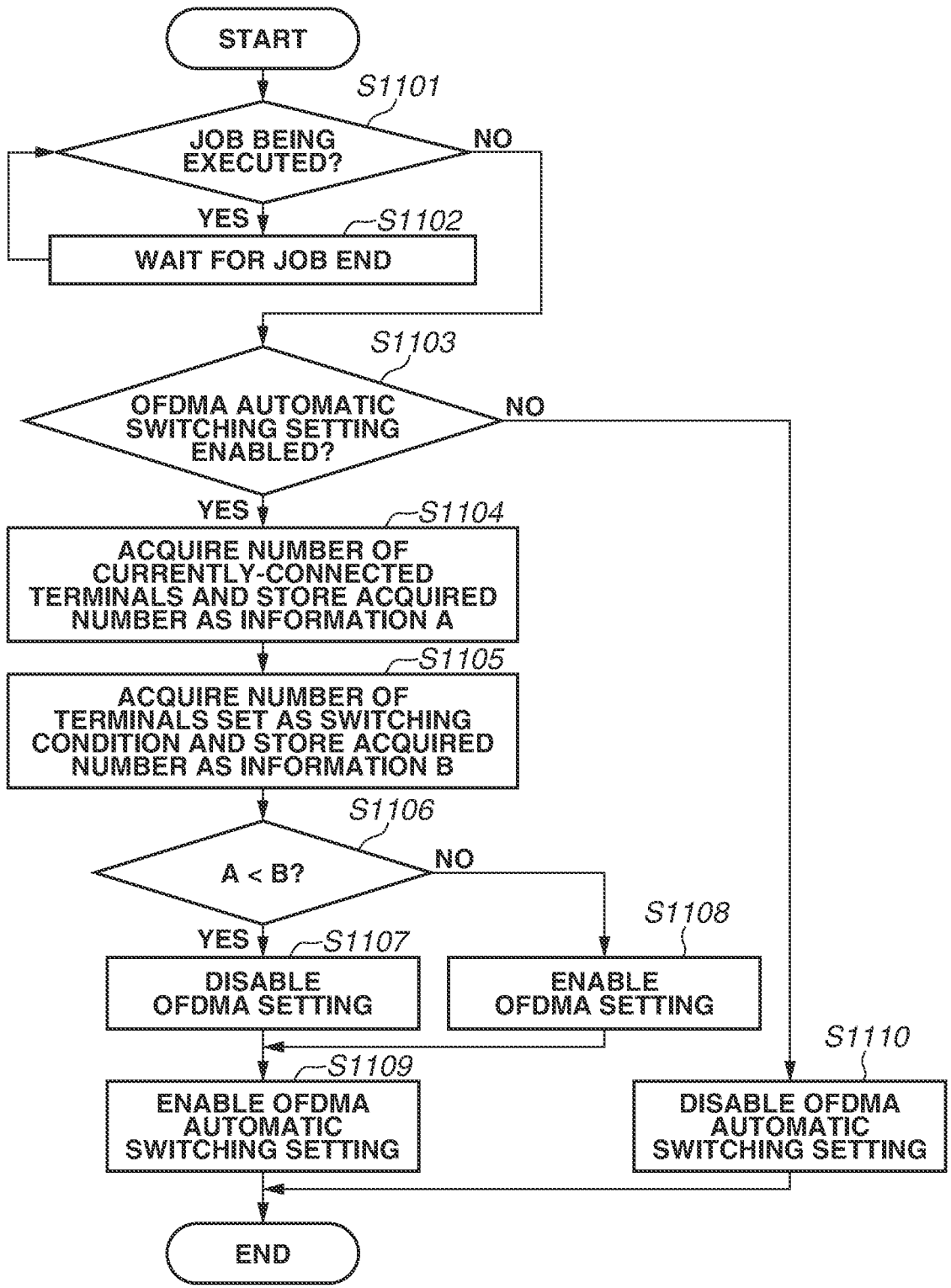
FIG. 11 is a flowchart illustrating automatic switching of OFDMA.

On the other hand, in a case where the automatic switching disabling item 911 on the screen illustrated in FIG. 9F is selected, the OFDMA mode automatic switching function is disabled in accordance with the flowchart in FIG. 11. At this time, as an OFDMA mode setting, a setting when the OFDMA mode automatic switching function is disabled is continued.

Figure 9I:
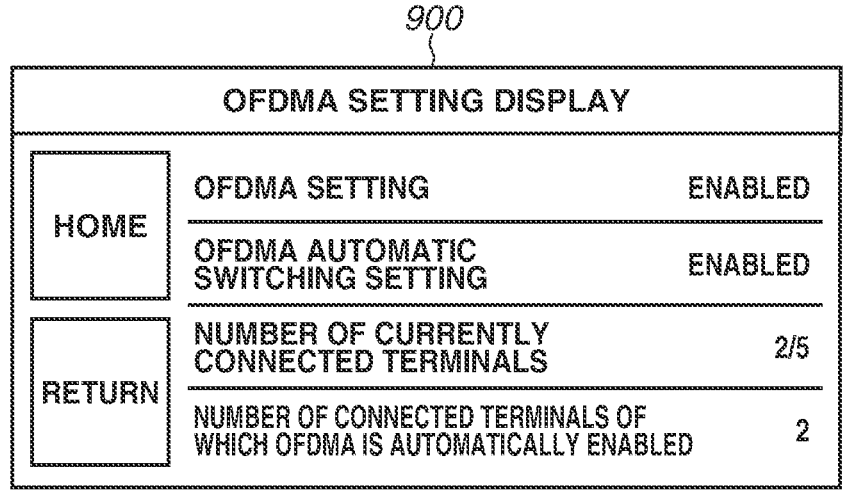

FIG. 9I illustrates an example of a setting screen to be displayed when the user selects the setting display item 907 on the screen illustrated in FIG. 9D. As illustrated in FIG. 9I, a setting state regarding OFDMA is displayed. Moreover, the number of mobile terminals 101 directly connecting with the MFP 151, and a setting value of the switching condition is displayed.

Figure 10:
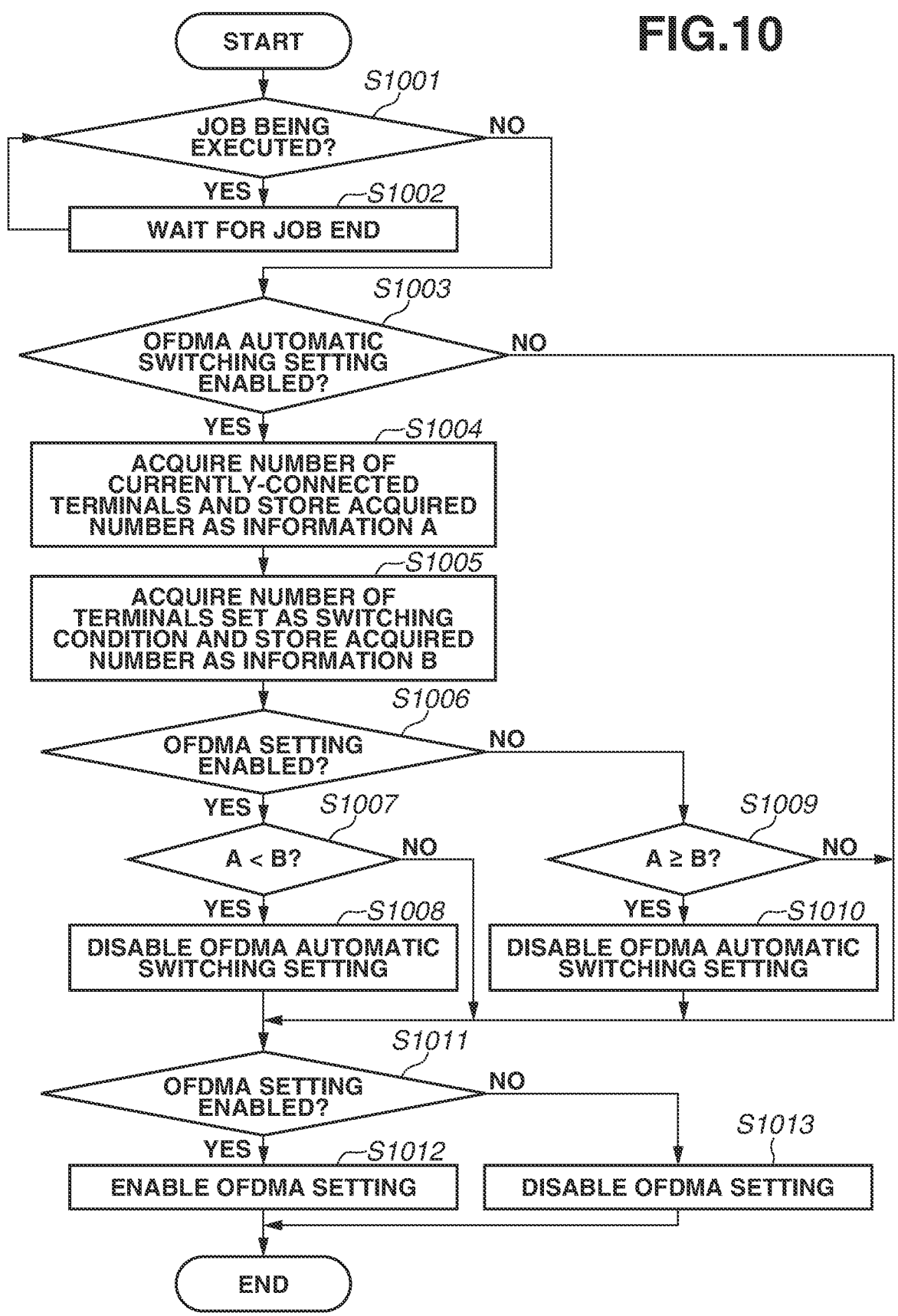
FIG. 10 is a flowchart illustrating setting processing of orthogonal frequency division multiple access (OFDMA).

FIG. 10 is a flowchart illustrating processing to be executed when the user selects the OFDMA enabling item 908 or the OFDMA disabling item 909 on the screen illustrated in FIG. 9E. The processing in the flowchart according to the present exemplary embodiment is implemented by the CPU 154 reading out a program related to the flowchart, from a memory, and executing the program.

In step S1001, the CPU 154 checks the state of the MFP 151 and checks whether the MFP 151 is executing a job. In a case where the state of the MFP 151 is a job executing state (YES in step S1001), the processing in FIG. 10 proceeds to step S1002, and waits for an end of the job. Examples of the job executing state include a state in which the print engine 155 of the MFP 151 is operating. In a case where the MFP 151 has a scanner function or a FAX function, which is not illustrated in FIG. 2B in the present exemplary embodiment, a state in which the scanner function or the FAX function is operating may be regarded as the job executing state. In a case where the OFDMA setting change is performed while a job is being executed, a method of direct communication between the MFP 151 and the mobile terminal 101 might change. Because the end of the job might be consequently delayed due to the change in the method of direct communication, the processing in steps S1001 to S1002 is executed in such a manner as not to execute the OFDMA setting change while a job is being executed. In a case where it is determined in step S1001 that the state of the MFP 151 is not the job executing state (NO in step S1001), the processing in FIG. 10 proceeds to step S1003.

In step S1003, the CPU 154 checks whether the OFDMA automatic switching setting is enabled. In a case where the OFDMA automatic switching setting is enabled (YES in step S1003), the processing in FIG. 10 proceeds to step S1004. On the other hand, in a case where the OFDMA automatic switching setting is disabled (NO in step S1003), the processing in FIG. 10 proceeds to step S1011.

In step S1004, the CPU 154 acquires the number of terminals connected to the MFP 151 operating as a master station in direct communication, and stores the acquired number as information A. Subsequently, in step S1005, the CPU 154 acquires the number of terminals set as a switching condition, and stores the acquired number as information B. In the present exemplary embodiment, the information A and the information B are stored into the RAM 153, but may be stored into the ROM 152.

In step S1006, the CPU 154 determines whether an OFDMA setting state is an enabled state. If the user selects the OFDMA enabling item 908 or the OFDMA disabling item 909, the selection result is stored into the RAM 153. The processing in step S1006 can be implemented by the CPU 154 acquiring the stored selection result in step S1006. In a case where it is determined that the OFDMA setting state is the enabled state (i.e., in a case where the user has selected the OFDMA enabling item 908) (YES in step S1006), the processing in FIG. 10 proceeds to step S1007.

In step S1007, the CPU 154 compares the numerical values stored as the information A and the information B. In a case where the numerical value stored as the information A is smaller than the numerical value stored as the information B (YES in step S1007), the processing in FIG. 10 proceeds to step S1008. On the other hand, in a case where the numerical value stored as the information A is equal to or larger than the numerical value stored as the information B (NO in step S1007), the processing in FIG. 10 proceeds to step S1011.

In step S1008, the CPU 154 changes the OFDMA automatic switching setting to a disabled state. In a case where the numerical value stored as the information A is smaller than the numerical value stored as the information B, if OFDMA automatic switching control to be described below with reference to FIG. 11 is executed, the CPU 154 switches the OFDMA setting to the disabled state.

That is, to prevent the execution of processing contradictory to an operation of selecting the OFDMA enabling item 908 that has been performed by the user, the CPU 154 disables the OFDMA automatic switching setting in step S1008.

On the other hand, in a case where it is determined in step S1006 that the OFDMA setting state is the disabled state (NO in step S1006), the processing in FIG. 10 proceeds to step S1009. In step S1009, the CPU 154 compares the numerical values stored as the information A and the information B. In a case where the numerical value stored as the information A is equal to or larger than the numerical value stored as the information B (YES in step S1009), the processing in FIG. 10 proceeds to step S1010. On the other hand, in a case where the numerical value stored as the information A is smaller than the numerical value stored as the information B (NO in step S1009), the processing in FIG. 10 proceeds to step S1011. In step S1010, the CPU 154 changes the OFDMA automatic switching setting to the disabled state. In a case where the numerical value stored as the information A is equal to or larger than the numerical value stored as the information B, if the OFDMA automatic switching control to be described below with reference to FIG. 11 is executed, the CPU 154 switches the OFDMA setting to the enabled state. That is, to prevent the execution of processing contradictory to an operation of selecting the OFDMA disabling item 909 that has been performed by the user, the CPU 154 disables the OFDMA automatic switching setting in step S1010.

In step S1011, the CPU 154 performs determination processing similar to the processing in step S1006. In a case where it is determined in step S1011 that the OFDMA setting state is the enabled state (YES in step S1011), the processing in FIG. 10 proceeds to step S1012. In step S1012, the CPU 154 enables the OFDMA setting. As described above, by enabling the OFDMA setting, the MFP 151 transmits a Trigger frame including information regarding OFDMA, to a mobile terminal 101 serving as a communication partner of direct communication. The mobile terminal 101 consequently executes wireless communication that uses the OFDMA mode, in direct communication with the MFP 151.

In a case where it is determined in step S1011 that the OFDMA setting state is the disabled state (NO in step S1011), the processing in FIG. 10 proceeds to step S1013. In step S1013, the CPU 154 disables the OFDMA setting. As described above, by disabling the OFDMA setting, the MFP 151 transmits a Trigger frame including information indicating that OFDMA is disabled, to a mobile terminal 101 serving as a communication partner of direct communication. The mobile terminal 101 consequently executes wireless communication that uses the OFDM mode, in direct communication with the MFP 151.

By the above-described processing illustrated in FIG. 10, the MFP 151 becomes able to execute wireless communication as intended by the user.

FIG. 11 is a flowchart illustrating processing to be executed at a predetermined interval in a case where the user selects the automatic switching enabling item 910 or the automatic switching disabling item 911 on the screen illustrated in FIG. 9F. The processing illustrated in FIG. 11 may be executed when the power of the MFP 151 is turned ON.

Because the processing in steps S1101 and S1102 is similar to the processing in steps S1001 and S1002 of FIG. 10, the detailed description will be omitted.

In step S1103, the CPU 154 determines whether a setting state of the OFDMA mode automatic switching function is an enabled state. If the user selects the automatic switching enabling item 910 or the automatic switching disabling item 911, the selection result is stored into the RAM 153. Alternatively, a result of the processing executed in step S1008 or S1010 of FIG. 10 is stored into the RAM 153. The processing in step S1103 can be implemented by the CPU 154 acquiring, in step S1103, the result of selection made by the user (or the result of the processing executed in step S1008 or S1010 of FIG. 10). In a case where it is determined that a setting state of the OFDMA mode automatic switching function is the enabled state (YES in step S1103), the processing in FIG. 11 proceeds to step S1104. Because the processing in steps S1104 and S1105 is the same processing as the above-described processing in steps S1004 and S1005, the detailed description will be omitted.

In step S1106, the CPU 154 compares the numerical values stored as the information A and the information B. In a case where the numerical value stored as the information A is smaller than the numerical value stored as the information B (YES in step S1106), the processing in FIG. 11 proceeds to step S1007. In step S1007, the CPU 154 changes the OFDMA setting to a disabled state. This is because a condition for changing the OFDMA setting to the enabled state is not satisfied since the number of terminals connected to the MFP 151 operating as a master station in direct communication, which is stored as the information A, is smaller than the number of connected terminals serving as the switching condition, which is stored as the information B. Because processing efficiency is expected to become higher without the use of OFDMA in a case where the number of connected terminals is smaller than the switching condition, the processing in step S1107 is executed.

On the other hand, in a case where the numerical value stored as the information A is equal to or larger than the numerical value stored as the information B (NO in step S1106), the processing in FIG. 11 proceeds to step S1108. In step S1108, the CPU 154 changes the OFDMA setting to the enabled state. This is because a condition for changing the OFDMA setting to the enabled state is satisfied since the number of terminals connected to the MFP 151 operating as a master station in direct communication, which is stored as the information A, is equal to or larger than the number of connected terminals serving as the switching condition, which is stored as the information B. Because processing efficiency is expected to become higher with the use of OFDMA in a case where the number of connected terminals is equal to or larger than the switching condition, the processing in step S1108 is executed.

In step S1109, the CPU 154 maintains the automatic switching setting of the OFDMA mode in the enabled state.

On the other hand, in a case where it is determined in step S1103 that a setting state of the OFDMA mode automatic switching function is the disabled state (NO in step S1103), the processing in FIG. 11 proceeds to step S1110. In step S1110, the CPU 154 maintains the automatic switching setting of the OFDMA mode in the disabled state.

As described above, by the processing illustrated in FIG. 11, it becomes possible to automatically switch the OFDMA mode, and the convenience of users can be enhanced.

Figure 12:
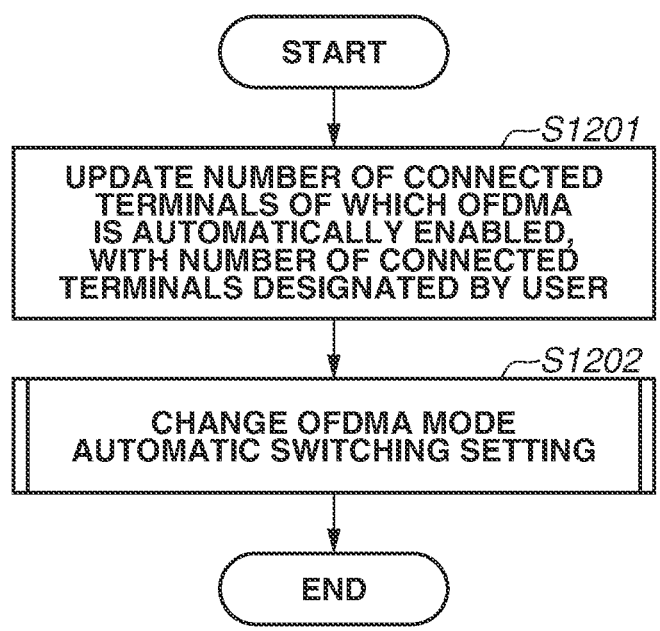
FIG. 12 is a flowchart illustrating automatic switching of OFDMA.

FIG. 12 is a flowchart illustrating processing to be executed when the number of connected terminals serving as a switching condition on the screens illustrated in FIGS. 9G and 9H is changed.

In step S1201, the CPU 154 updates the number of connected terminals stored in the ROM 152, with the number of connected terminals designated by the user on the screen illustrated in FIG. 9H. Subsequently, the CPU 154 executes the processing illustrated in step S1202 (i.e., processing based on the flowchart illustrated in FIG. 11).

As described above, by the processing illustrated in FIG. 12, it becomes possible to change the number of connected terminals serving as a switching condition, and the user becomes able to execute the automatic switching function of the OFDMA mode based on a condition desired by the user.

Figure 13:
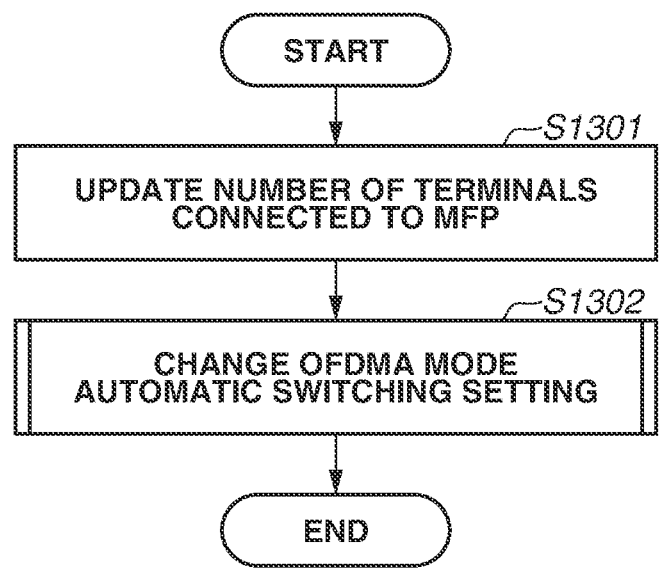
FIG. 13 is a flowchart illustrating automatic switching of OFDMA.

FIG. 13 is a flowchart illustrating processing to be executed in a case where the number of terminals connecting to the MFP 151 operating as a master station in direct communication is changed. The change in the number of connected terminals can be detected by the communication unit 156. When the communication unit 156 detects a change in the number of connected terminals, a control flow illustrated in FIG. 13 is executed.

In step S1301, the CPU 154 updates the number of terminals connected to the MFP 151. Subsequently, the CPU 154 executes the processing illustrated in step S1302 (i.e., processing based on the flowchart illustrated in FIG. 11).

As described above, by the processing illustrated in FIG. 13, it becomes possible to execute automatic switching of the OFDMA mode in accordance with a change in the number of connected terminals connected to the MFP 151.

According to the present exemplary embodiment, the user can arbitrarily switch the OFDMA mode setting of the OFDMA mode, and wireless direct communication intended by the user can be performed. With this configuration, even in a case where OFDMA is enabled in infrastructure communication, for example, the MFP 151 can execute direct communication in which OFDMA is disabled. Moreover, by the OFDMA mode automatic switching function, it becomes possible to automatically change the OFDMA mode in accordance with the number of connected mobile terminals 101 connected to the MFP 151, and the convenience of users is enhanced.

In the first exemplary embodiment, the user can make settings on both of the screens illustrated in FIGS. 9E and 9F. In a second exemplary embodiment, an exemplary embodiment in which settings on the screens illustrated in FIGS. 9E and 9F are in an exclusive relationship will be described.

In a case where the user selects the OFDMA enabling item 908 or the OFDMA disabling item 909 on the screen illustrated in FIG. 9E, a selection result on the screen illustrated in FIG. 9F is cleared. On the other hand, in a case where the user selects the automatic switching enabling item 910 or the automatic switching disabling item 911 on the screen illustrated in FIG. 9F, a selection result on the screen illustrated in FIG. 9E is cleared.

Figure 14:
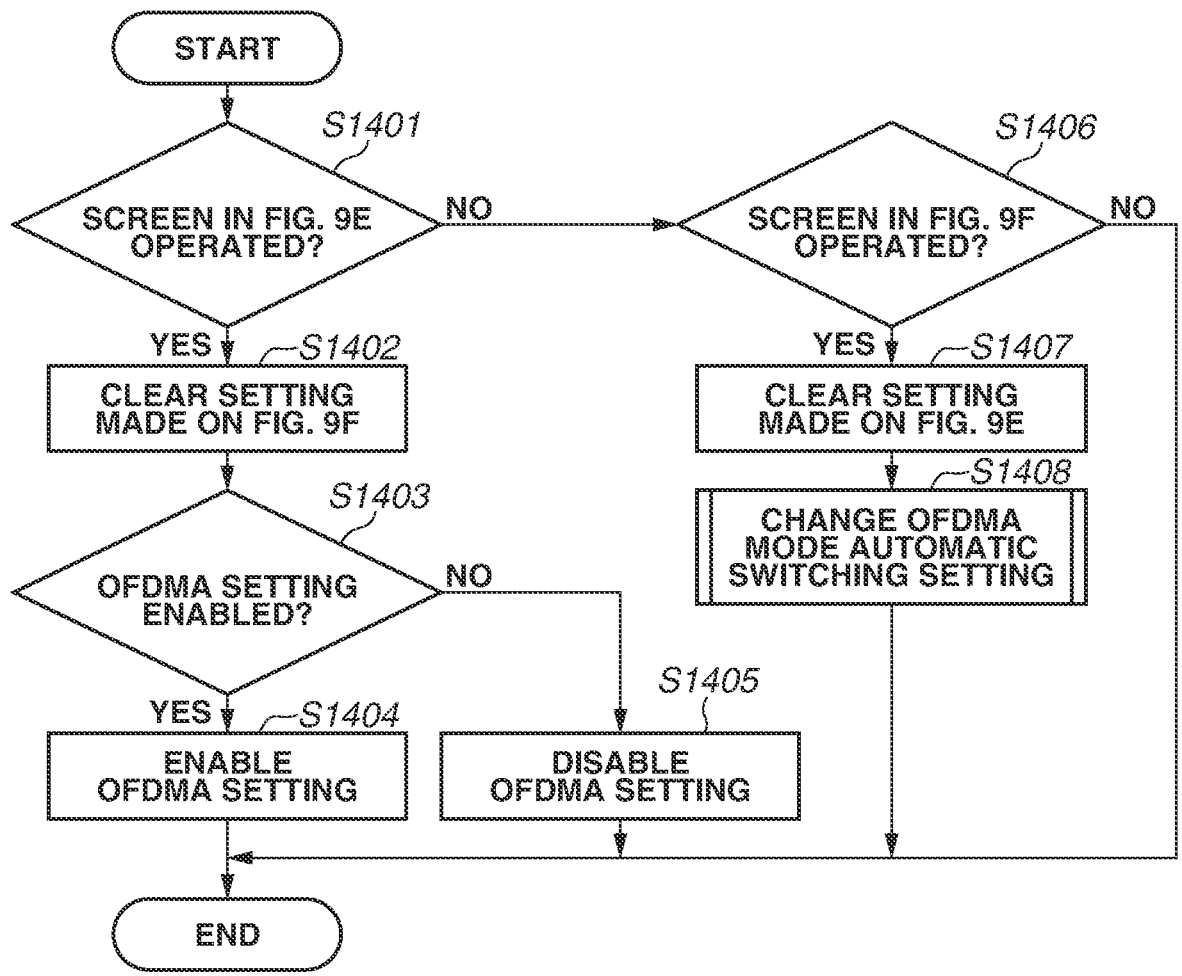
FIG. 14 is a flowchart illustrating setting processing of OFDMA.

FIG. 14 is a flowchart illustrating OFDMA setting processing to be executed in the present exemplary embodiment.

In step S1401, the CPU 154 determines whether the screen illustrated in FIG. 9E has been operated. In a case where it is determined in step S1401 that the screen illustrated in FIG. 9E has been operated (YES in step S1401), the processing proceeds to step S1402. In step S1402, the CPU 154 clears the setting made on the screen illustrated in FIG. 9F. At this time, the CPU 154 may display a warning message indicating that the setting made on the screen illustrated in FIG. 9F is to be cleared. Because the processing in steps S1403 to S1405 is processing similar to the processing in steps S1011 to S1013, the detailed description will be omitted.

In a case where it is determined in step S1401 that the screen illustrated in FIG. 9E has not been operated (NO in step S1401), the processing proceeds to step S1406. In step S1406, the CPU 154 determines whether the screen illustrated in FIG. 9F has been operated. In a case where it is determined in step S1406 that the screen illustrated in FIG. 9F has been operated (YES in step S1406), the processing proceeds to step S1407. In step S1407, the CPU 154 clears the setting made on the screen illustrated in FIG. 9E. At this time, the CPU 154 may display a warning message indicating that the setting made on the screen illustrated in FIG. 9E is to be cleared. Subsequently, the CPU 154 executes the processing illustrated in step S1408 (i.e., processing based on the flowchart illustrated in FIG. 11).

In a case where it is determined in step S1406 that the screen illustrated in FIG. 9F has not been operated (NO in step S1406), the processing illustrated in FIG. 14 ends. According to the present exemplary embodiment, the user can arbitrarily switch the OFDMA mode setting of the OFDMA mode, and wireless direct communication intended by the user can be performed. With this configuration, even in a case where OFDMA is enabled in infrastructure communication, for example, the MFP 151 can execute direct communication in which OFDMA is disabled.

Other Exemplary Embodiments

In the above-described exemplary embodiments, the description has been given of the example in which various settings are changed on the display unit 161 of the MFP 151, but the configuration is not limited to this. For example, the mobile terminal 101 or an apparatus connecting with the MFP 151 via the external AP 131 may display the screens illustrated in FIGS. 9A to 9I and settings may be changed thereon. In this case, the user may make settings using an application adapted to the MFP 151, or may make settings using a remote UI function via a browser of the mobile terminal 101. The remote UI function is a function by which the MFP 151 provides a Web screen to a browser of the mobile terminal 101 as a server by the user entering an internet protocol (IP) address of the MFP 151 into an address entry region on the browser. In the above-described exemplary embodiment, the MFP 151 provides the screens illustrated in FIGS. 9A to 9I, to a browser of the mobile terminal 101 as Web screens.

The processing in the above-described exemplary embodiment may be executed after infrastructure connection is established, or may be executed before infrastructure connection is established.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

What is claimed is:

1. A communication apparatus comprising:
   at least one memory and at least one processor which function as:
   a first setting unit configured to enable a first mode in which wireless communication is executed via an external access point existing on an outside of the communication apparatus;
   a second setting unit configured to enable a second mode in which wireless communication is executed not via an external access point existing on an outside of the image forming apparatus;
   a providing unit configured to provide a setting screen regarding orthogonal frequency division multiple access (OFDMA) complying with an Institute of Electrical and Electronics Engineers (IEEE) 802.11 standard in wireless communication in the second mode;
   a receiving unit configured to receive a first Trigger frame including information regarding OFDMA complying with an IEEE 802.11 standard, from an external access point existing on an outside of the communication apparatus, while the first mode is enabled;
   a communication unit configured to execute communication processing in the first mode by OFDMA complying with an IEEE 802.11 standard, based on information regarding the first Trigger frame; and
   a control unit configured to control the communication apparatus not to execute OFDMA complying with an IEEE 802.11 standard, in wireless communication in the second mode, based on a setting made on the setting screen, in a case where OFDMA complying with an IEEE 802.11 standard is enabled in the first mode.

2. The communication apparatus according to claim 1, wherein the communication unit transmits information indicating a remaining amount of a consumable of the communication apparatus or a state of the communication apparatus, based on OFDMA complying with an IEEE 802.11 standard.

3. The communication apparatus according to claim 2,
   wherein the communication apparatus is a printing apparatus,
   wherein the remaining amount of the consumable is at least one of a remaining amount of ink, a remaining amount of toner, and a remaining amount of a sheet, and
   wherein information indicating a state of the communication apparatus is at least one of a paper jam error and cover open.

4. The communication apparatus according to claim 1, wherein the at least one memory and the at least one processor further function as a determination unit configured, in a case where an automatic switching function of OFDMA is enabled on the setting screen, and the number of connected communication partner apparatuses connecting with the communication apparatus in wireless communication in the second mode satisfies a switching condition of OFDMA, to determine to execute the OFDMA in wireless communication in the second mode, and in a case where an automatic switching function of OFDMA is enabled on the setting screen, and the number of connected communication partner apparatuses connecting with the communication apparatus in wireless communication in the second mode does not satisfy a switching condition of OFDMA, to determine not to execute the OFDMA in wireless communication in the second mode.

5. The communication apparatus according to claim 4, wherein the at least one memory and the at least one processor further function as an identification unit configured, in a case where an automatic switching function of OFDMA is enabled on the setting screen, to identify the number of connected communication partner apparatuses connecting with the communication apparatus in wireless communication in the second mode, at a predetermined interval.

6. The communication apparatus according to claim 1, wherein, in a case where the second mode is enabled, the communication apparatus determines a communication channel to be used in wireless communication in the second mode.

7. The communication apparatus according to claim 1, wherein the first mode is an infrastructure mode, and the second mode is a software access point (AP) mode.

8. The communication apparatus according to claim 1, wherein the first mode is an infrastructure mode, and the second mode is Wi-Fi Direct.

9. The communication apparatus according to claim 1, wherein the providing unit provides the setting screen to a communication partner apparatus connecting to the external access point in communication in the first mode, or a communication partner apparatus in communication in the second mode.

10. The communication apparatus according to claim 1, wherein the providing unit provides the setting screen to a display unit of the communication apparatus.

11. The communication apparatus according to claim 1, wherein the at least one memory and the at least one processor further function as a print processing unit configured to execute print processing onto a sheet based on a print job received via wireless communication in the first mode or wireless communication in the second mode.

12. A method for a communication apparatus, the method comprising:

enabling a first mode in which wireless communication is executed via an external access point existing on an outside of the communication apparatus;

enabling a second mode in which wireless communication is executed not via an external access point existing on an outside of the image forming apparatus;

providing a setting screen regarding orthogonal frequency division multiple access (OFDMA) complying with an Institute of Electrical and Electronics Engineers (IEEE) 802.11 standard in wireless communication in the second mode;

receiving a first Trigger frame including information regarding OFDMA complying with an IEEE 802.11 standard, from an external access point existing on an outside of the communication apparatus, while the first mode is enabled;

executing communication processing in the first mode by OFDMA complying with an IEEE 802.11 standard, based on information regarding the first Trigger frame; and controlling the communication apparatus not to execute OFDMA complying with an IEEE 802.11 standard, in wireless communication in the second mode, based on a setting made on the setting screen, in a case where OFDMA complying with an IEEE 802.11 standard is enabled in the first mode.

13. A non-transitory computer readable storage medium storing instructions for causing a computer of a communication apparatus to perform a process, the process comprising:

enabling a first mode in which wireless communication is executed via an external access point existing on an outside of the communication apparatus;

enabling a second mode in which wireless communication is executed not via an external access point existing on an outside of the image forming apparatus;

providing a setting screen regarding orthogonal frequency division multiple access (OFDMA) complying with an Institute of Electrical and Electronics Engineers (IEEE) 802.11 standard in wireless communication in the second mode;

receiving a first Trigger frame including information regarding OFDMA complying with an IEEE 802.11 standard, from an external access point existing on an outside of the communication apparatus, while the first mode is enabled;

executing communication processing in the first mode by OFDMA complying with an IEEE 802.11 standard, based on information regarding the first Trigger frame; and controlling the communication apparatus not to execute OFDMA complying with an IEEE 802.11 standard, in wireless communication in the second mode, based on a setting made on the setting screen, in a case where OFDMA complying with an IEEE 802.11 standard is enabled in the first mode.

* * * * *